March 5, 1946.  E. V. MURPHREE ET AL  2,395,901
MANUFACTURE OF POLYMERS
Filed Sept. 14, 1943   5 Sheets-Sheet 5

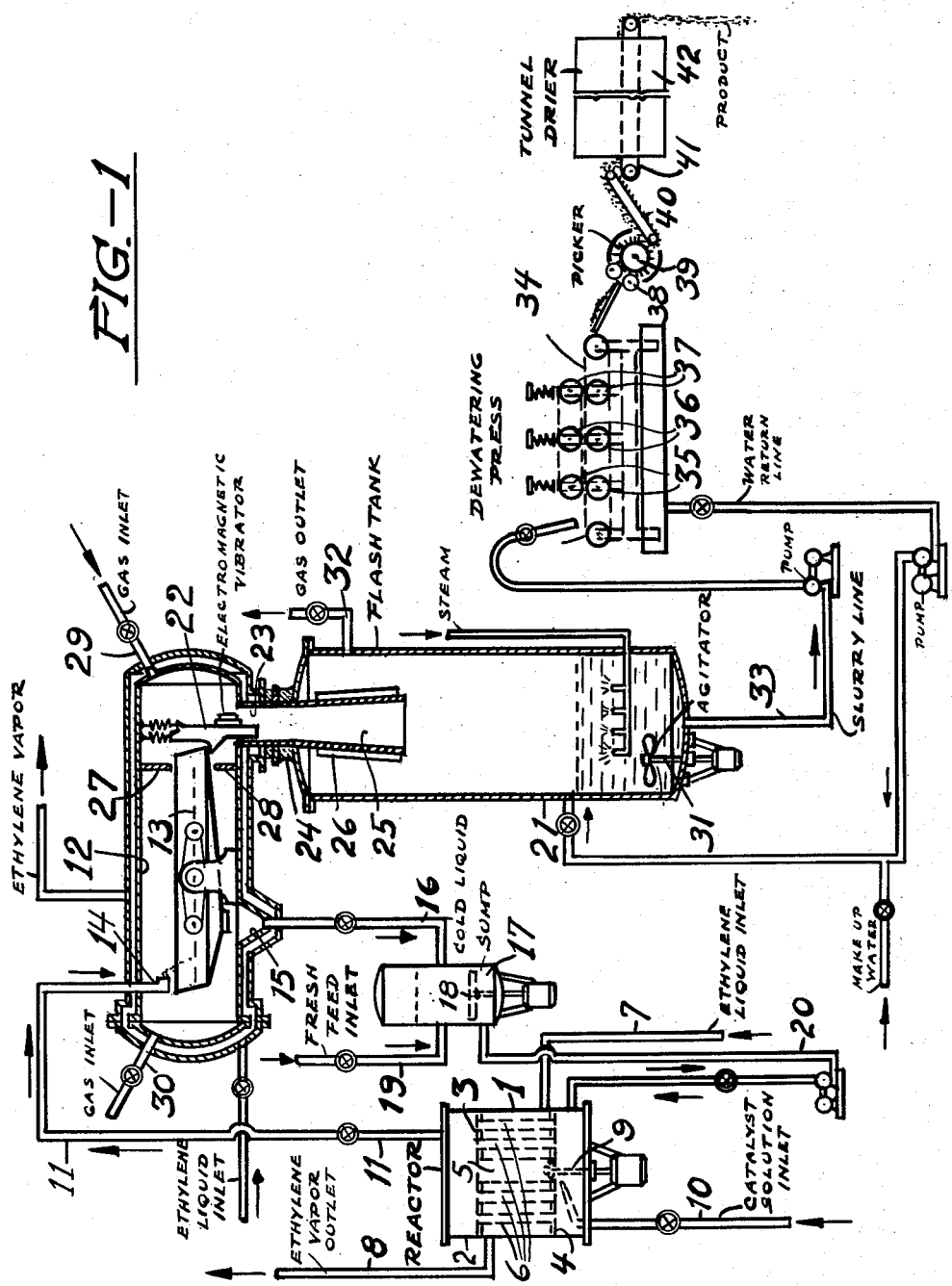

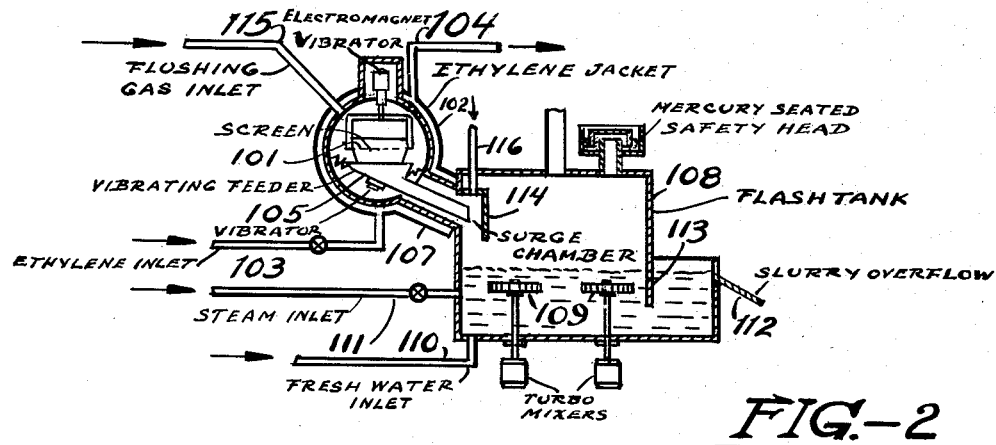
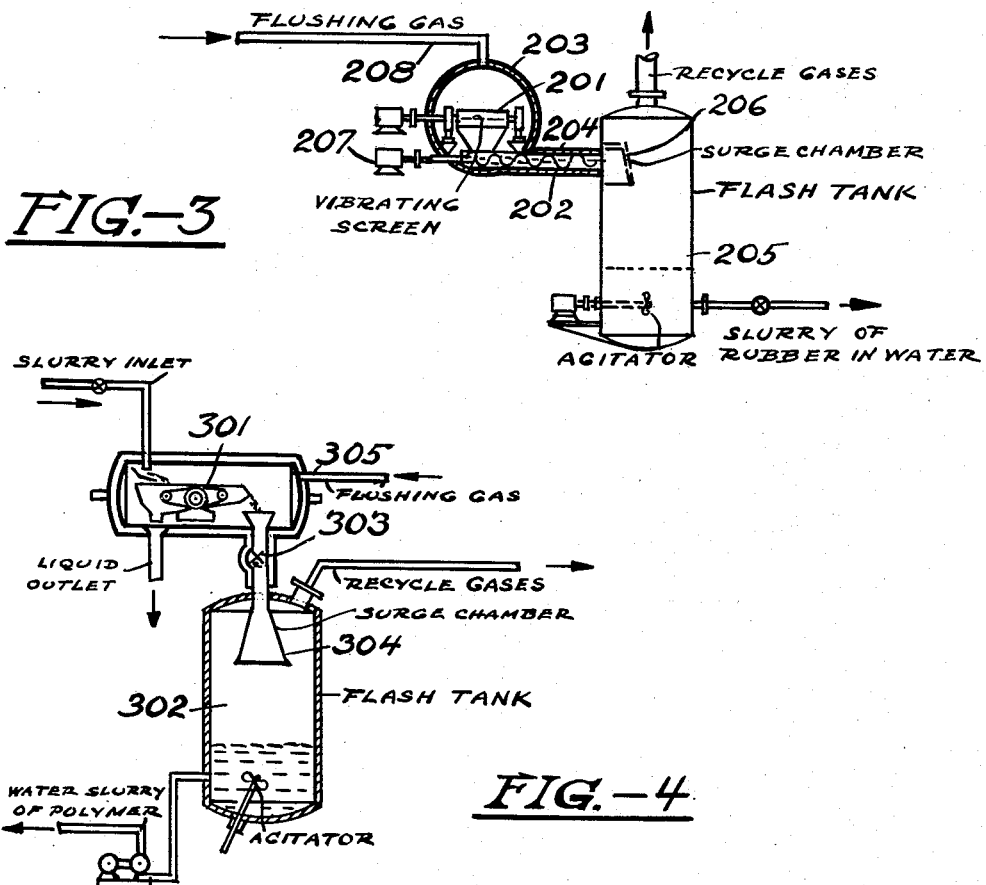

Patented Mar. 5, 1946

2,395,901

UNITED STATES PATENT OFFICE 2,395,901

MANUFACTURE OF POLYMERS

Eger V. Murphree, Summit, and Wendell W. Waterman and Arthur D. Green, Cranford, N. J., assignors, by mesne assignments, to Jasco, Incorporated, a corporation of Louisiana Application September 14, 1943, Serial No. 502,258

22 Claims. (Cl. 260—93)

This invention pertains to a process and apparatus for low temperature polymerization of isoolefins or mixtures of isoolefins and diolefins.

In the copending applications Serial No. 511,699, filed November 25, 1943, by Arthur D. Green, and Serial No. 483,882, filed April 21, 1943, by Arthur D. Green and Walter J. Paltz, there are disclosed improvements in the manufacture of high molecular weight polymers such as the polyisoolefins of 15,000 to 25,000 up to about 200,000 to 300,000 molecular weight or more disclosed in the Mueller-Cunradi et al. U. S. Patent 2,203,873, dated June 11, 1940, and the isoolefin-diolefin copolymers of about 20,000 molecular weight and higher disclosed in Australian Patent No. 112,875, issued July 31, 1941. These high molecular weight polymers are, in general, prepared by treating isoolefins or mixtures of isoolefins and conjugated diolefins with a Friedel-Crafts type catalyst at temperatures below −10° C., preferably below about −40° C. The first of the above-identified applications discloses the improvement involving conducting the polymerization in such a manner as to form a slurry of polymer in cold reaction mixture which is dropped into heated, well-agitated water in order to flash off volatile materials which are drawn off, subjected to recovery operations and recycled to the reaction, and to form a water slurry of polymer particles. The advantages of this procedure are that the process can be conducted continuously, it permits recovery of unreacted materials and yields the polymer in relatively finely divided form which may be degassed in relatively simple equipment. The Green and Paltz application identified above improves on this procedure by subjecting the cold slurry from the polymerization reactor to a straining or filtering operation at substantially the same temperature that the polymerization was effected in order to recover the bulk of the cold liquid materials, for recycling directly to the reaction zone and reducing to a minimum the amount of unreacted materials that are flashed off and must be recovered for recycling in the process by compressing, cooling, fractionating and the like. This process has the advantage of reducing to a very substantial extent the size of the refrigeration and fractionation equipment necessary for the conduct of the process or of multiplying the production capacity of existing plants several fold with only a relatively small addition to the plant. The latter process retains the other advantages of the former process, namely, of yielding a water slurry of finely divided solids which may be readily and completely degassed.

In the copending application Serial No. 481,408, filed April 1, 1943, by John H. Bannon and Donald C. Field, there is described an improvement on the latter procedure. According to this application, carbon black or other pigment material is provided in the polymerization reaction mixture in order to improve the filtrability of the polymer slurry or to facilitate the formation of a filterable slurry.

We have found that although these polymers when freshly filtered from the reaction mixture are usually relatively non-tacky and non-agglomerating at low enough temperatures (for example, below about −100° F.), they exhibit extreme tackiness at higher temperatures up to the boiling point of the adhering liquids. Accordingly, there is a major mechanical problem involved in transferring the cold polymer particles from the screening or filtering zone into a flash tank or chamber wherein the polymer is introduced into heated water or other medium for separating the volatile liquids from the polymer and bringing the polymer particles up to a sufficiently elevated temperature that the polymer no longer exhibits an undesirable tackiness or tendency to agglomerate. It is important that this operation be carried out without excessive agglomeration of the polymer particles in order that the degassed polymer may be removed from the flash tank in the form of a slurry which may be readily subjected to finishing operations as are hereinafter described.

It is the object of this invention to provide the art with a process and apparatus for transferring cold polymer particles from a screening zone to a flashing zone.

It is a further object of this invention to provide the art with a method and apparatus whereby screened polymer particles are maintained at a sufficiently low temperature to prevent their becoming tacky or agglomerating.

It is also an object of this invention to keep the polymer particles separated from one another during the time that they are being heated up to the flashing liquid temperature.

It is a further object of this invention to provide a method and apparatus whereby flashed vapors, particularly water vapor, are prevented from backing up into the cold equipment wherein they would freeze and foul the equipment.

These and other objects will appear more clearly from the detailed description and claims which follow.

We have found that polymer particles may be transferred from a screening zone to a flashing zone without agglomeration if the polymer particles are kept cold until they are inside the flash drum and are kept separated from one another while they are becoming heated up to the temperature of the flashing liquid and are prevented from touching warm surfaces until they hit highly agitated flashing liquid. In this operation it is necessary to prevent the flash gases from backing up into the screening zone, since the flashing liquid, in the usual case water, not only would freeze on the equipment in the screening zone thereby tending to obstruct the discharge of solid polymer from the screen or interfere with the passage of liquid through the screen, but also upon entering the reactant circulating system might act as a poison to the reaction. In accordance with the present invention we accomplish this transfer of solid polymer from the screening zone to the flashing zone without permitting passage of the flash gases back into the screen enclosure by passing a stream of sealing gas, concurrently with the polymer particles, from the screening zone into the flash chamber. It is another feature of this invention to provide an intermediate surge chamber which is designed to absorb surges in pressure in the flash chamber that occur from time to time due to uneven vaporization of the volatile liquids associated with the polymer.

Apparatus in accordance with our invention and suitable for the conduct of our process is illustrated in the accompanying drawings, wherein Figure 1 is a diagrammatic view of a continuous polymerization equipment provided with the preferred embodiment of means for transferring polymer particles from a screening zone to a flashing zone and for preventing backing up of flashed vapors into the screening zone.

Figure 2 is a diagrammatic cross section of another embodiment of our invention wherein the polymer drops from a screening member onto a vibrating feeder that extends into the flash tank and in which means for supplying a stream of sealing gas concurrently with the polymer is provided. An alternate type of flash tank is shown.

Figure 3 is a sketch showing another embodiment of the invention wherein the polymer dropped off the end of the screen is transferred into the flashing zone by means of a helical screw rotating in a tube. Here too a stream of flushing gas is passed through the tube concurrently with the polymer, and a surge chamber is provided at the discharge end of the screw.

Figure 4 is a diagrammatic sketch showing an embodiment using a "star" feeder as a means of insuring conveyance of the polymer from the end of the screen to the surge chamber in the flash tank. Still another alternative, not shown in the figures, would be to avoid entirely the use of mechanical transfer means by dropping the polymer directly from the end of the screen through a passageway only slightly constricted, and leading into the flashing zone through a surge chamber while passing concurrently with the polymer a stream of flushing gas.

Figure 5:
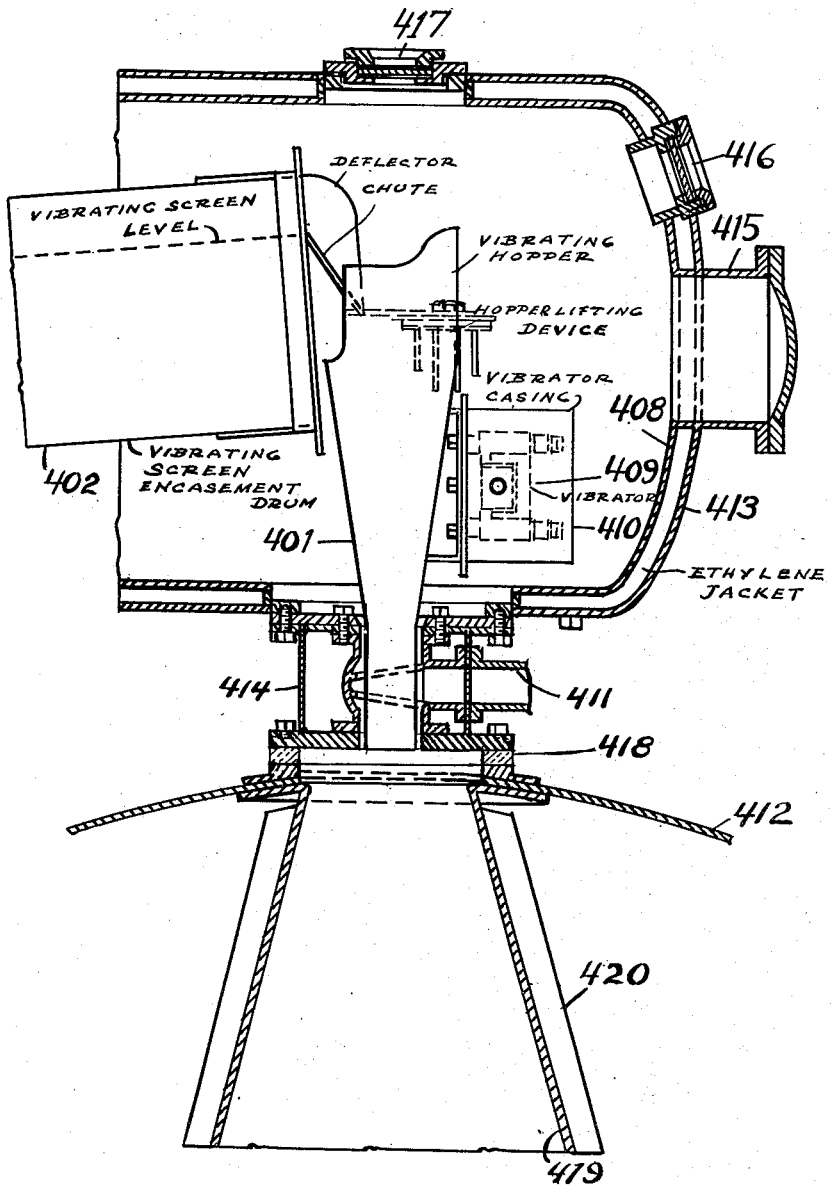

Figure 5 is a sectional elevation showing in detail an advantageous arrangement of the vibrating hopper in the preferred embodiment of this invention.

Figure 6:
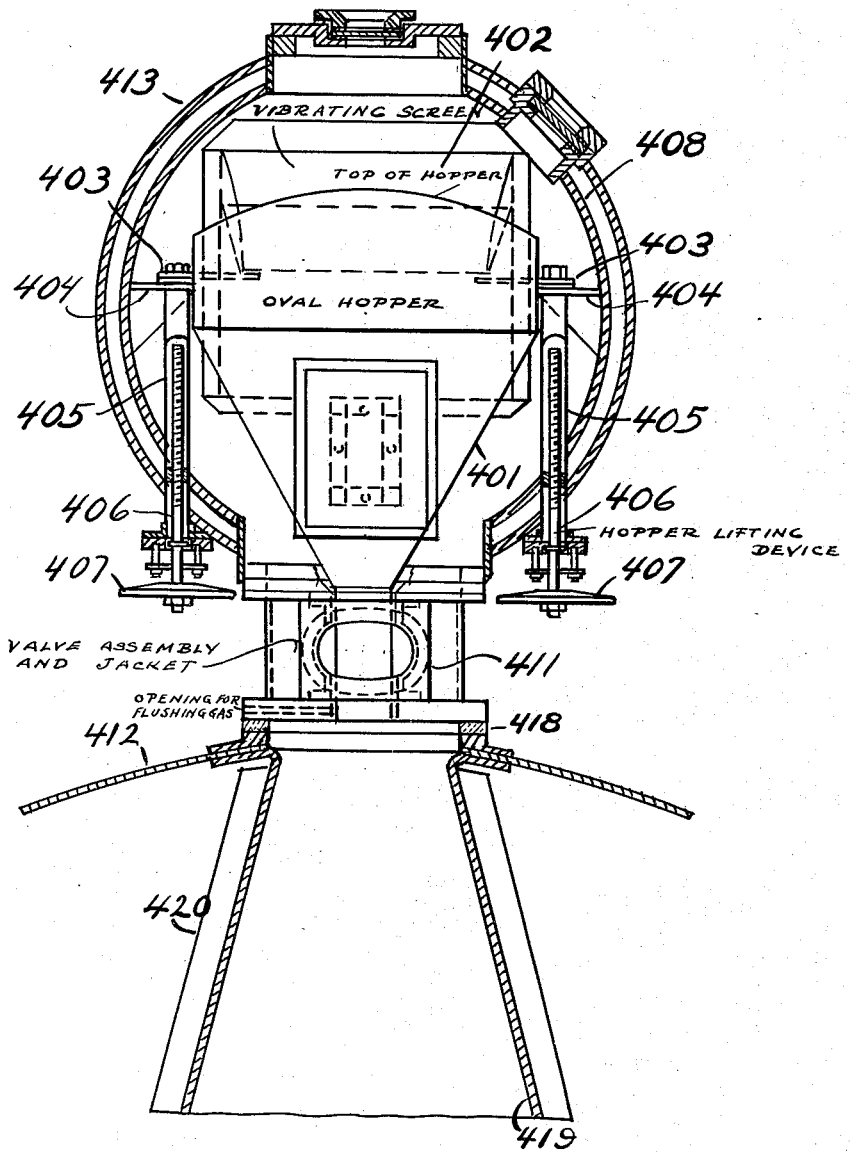
Figure 7:
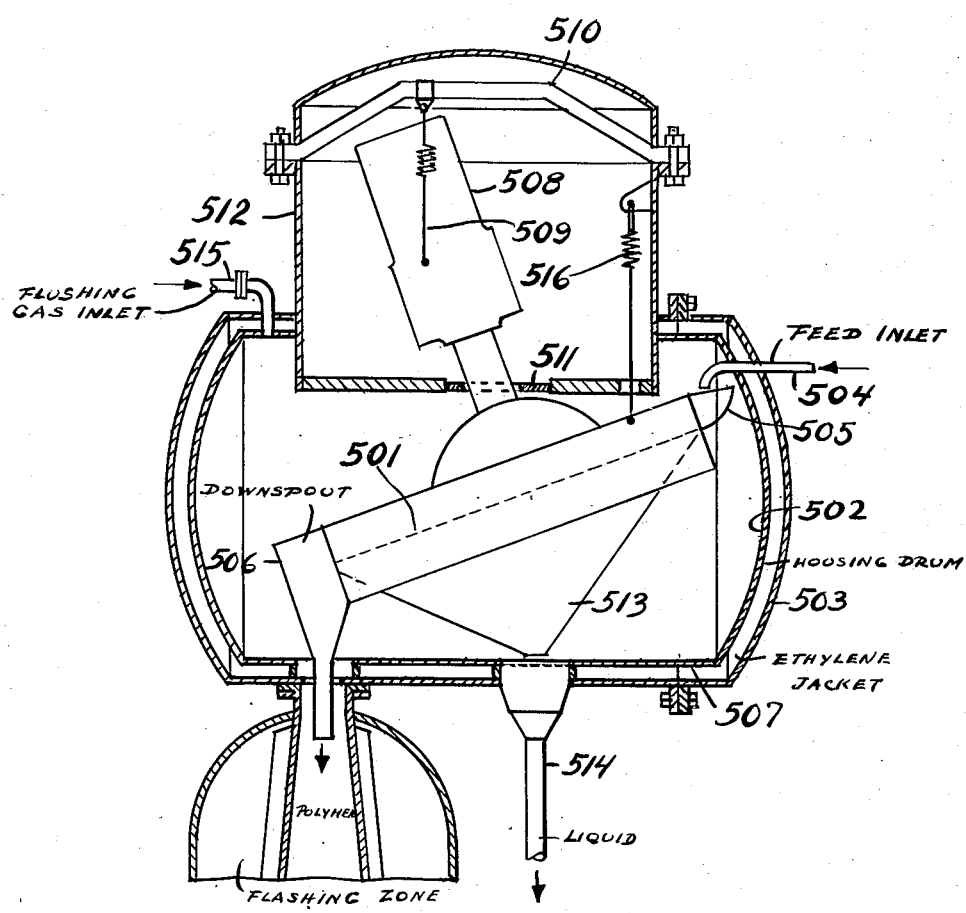

Figure 6 is a cross section of the vibrating hopper arrangement of Figure 5; and Figure 7 shows an alternate type of vibrating screen and housing, using an electromagnetic vibrator.

Referring to Figure 1, the apparatus comprises a continuous reactor 1 of the type shown in copending application Serial No. 448,575, filed June 26, 1942, by John H. Bannon. The reactor comprises a shell or casing 2 provided with an upper tube-sheet 3 and a lower tube-sheet 4 between which there are positioned a relatively large diameter central draft tube 5 and a plurality of smaller return tubes 6. The space between the tube-sheets and surrounding the draft tube and return tubes is supplied with a refrigerant such as ethylene through line 7. Ethylene which is vaporized by the absorption of the heat of reaction is removed through line 8 reliquefied by compression and cooling and returned to the reactor through line 7.

A motor driven agitator 9 is provided near the bottom of the draft tube 5 in order to produce circulation in the reactor. Catalyst solution, for example, aluminum chloride dissolved in methyl chloride, is supplied to the reactor through line 10 which discharges the catalyst solution in close proximity to the agitator in order that it may be effectively dispersed in the reaction mixture. Cold slurry, containing from about 1 to about 10% of solids, overflows under its own pressure continuously from the reactor through line 11 and passes while still cold to an enclosed chamber 12 provided with a screen 13 of the vibrating type. While the screen is preferably of the vibrating type having a circular motion in a vertical plane perpendicular to the screening surface and through the long axis thereof, it may also be of the electromagnetic type having a low amplitude straight line motion at some suitable angle with the screening surface. It may also be of the gyrating or reciprocating type having a circular or straight line motion in the plane of the screening surface or of any other kind which depends upon applied motion either alone or together with gravity for conveying the solid across the screen and for decreasing the tendency of the polymer to stick to the openings of the screen. The pipe 11 discharges the cold slurry into a weir box 14 which distributes the slurry across the screen. The cold liquid passes through the screen 13 and is collected in trough 15 which discharges the cold liquid into line 16 and thence into the sump tank 17. A motor driven mixer or agitator 18 is preferably provided in the sump tank for keeping any fine particles of slurry which pass through the screen with the cold liquid in suspension. Fresh feed comprising isoolefin and diolefin and preferably also methyl chloride is supplied to the sump tank through line 19 and is thoroughly mixed with the recycled cold reaction liquid. The combined liquid is withdrawn from the sump tank and is pumped through line 20 into the reactor, a suitable indirect refrigerating unit being provided in this line if the temperature of the feed to the reactor is appreciably above the desired reaction temperature. Since the reaction as well as the filtering steps are conducted at temperatures far below ordinary room temperature, it is essential to provide thermal insulation on the equipment in order to minimize the refrigeration requirements and also to prevent the polymer particles from becoming sticky as they are prone to do over a considerable temperature range between the reaction temperature and the flashing temperature.

The vibrating screen 13 can be of a standard type provided that suitable allowances are made for the fact that it is to be operated at temperatures in the vicinity of about −100° C. For example, the screen stabilizers can be of spring construction provided that they are made of suitably annealed and hardened "K" Monel, "Z" nickel, stainless steel, Phosphor bronze or other spring metal which can withstand these low temperatures. Also rubber stabilizers may be used by enclosing them in special chambers which are heated to maintain the elasticity of the rubber parts. In order to maintain the screen at a sufficiently low temperature, the screen enclosure can be surrounded by a jacket containing a refrigerant such as ethylene.

In the preferred case, a rapid circular motion, the stroke and speed of which can be varied, is imparted to the vibrating screen 13. This type of motion causes the polymer particles to move along the screen. By tilting the screen either upward or downward and at various angles, the time of residence of the solid polymer particles on the screen and the degree of liquid removal can be controlled.

The vibrating screen is located above the flash tank 21. The polymer particles fall from the end of the screen into a hopper 22. A suitable mechanical or electro-magnetic vibrator is connected to the hopper in order to impart vibratory movement to the hopper in order to promote steady flow of polymer therethrough. The top of the hopper is located within the screen enclosure proper while the bottom part extends downwardly into the pipe 23 connecting the enclosure and the flash drum. The enclosure 12 as well as the connecting pipe 23 is surrounded by a jacket to which liquid ethylene is supplied in order to keep cold both the screen and the separated solid polymer particles in the vibrating hopper. Heat insulating material 24 is provided between the jacketed pipe 23 and the top of the flash tank in order to avoid cooling the wall of the flash tank to such an extent as to cause the formation of ice thereon.

The polymer particles dropping from the vibrating hopper 22 fall through the surge chamber 25 into the heated liquid in the flash chamber 21. The wall of the surge chamber 25 may be cylindrical or conical in shape, the principal requirement being that it should be sufficiently large in diameter so that the polymer particles do not hit the warm sides of the surge chamber but drop directly as individual particles into the hot water below. The walls of the surge chamber 25 are kept at a temperature above the freezing point of water. For this purpose, fins 26 may be provided on the walls of the chamber in order to assist in the heat transfer or, if necessary, electrical or steam heating means may be provided thereon.

In order to keep water vapor from the flash tank from backing up into the screening zone and icing the cold surfaces, a sealing gas in introduced into the screen enclosure and blows through the vibrating hopper and the transfer pipe concurrently with the polymer. With properly designed equipment, the cold flushing gas would normally fill the surge chamber and the interface between this cold gas and the hot flash gas would be at the bottom of the surge chamber. If there should be a sudden increase in gas evolution, the pressure would increase in the flash tank and the interface between the hot and cold gases would move up into the surge chamber.

The volume of the surge chamber should be so chosen as to be greater than the volume of gas which could be compressed into the screen enclosure by the maximum pressure surge in the flash tank against which protection is desired. Thus, the larger the surge chamber, the greater the pressure surge that can be tolerated without icing up a screen enclosure of any given size providing suitable flushing gas velocities are maintained. As the diameter of the surge chamber is increased, there is a corresponding increase in the volume rate of flow of flushing gas necessary to confine the interphase between the cold gas from the screen enclosure and the hot moist flashed gases to the lower portion of the surge chamber. In other words, for a given flushing gas and a given surge chamber diameter, there is a minimum gas velocity which must be maintained at the surge chamber outlet. We have found that this requisite velocity is dependent upon the density of the flushing gas used, being much higher for gases of high density than for gases of low density. This is apparently due to the fact that the lighter the gas the more stratification is obtained inside the surge chamber and the less tendency for the cold and hot gases to mix therein. We find it preferable to keep the diameter of the surge chamber to the minimum which will still allow the polymer to drop through without appreciably coming into contact with the walls thereof. This is essential since the warm walls of the surge chamber offer a surface to which the polymer readily adheres. The length of the chamber should be the minimum required to provide the volume necessary to absorb the anticipated surges. In this way the amount of flushing gas required is a practical minimum.

The sealing gas may be natural gas, hydrogen, methane, nitrogen or other gas of low condensing temperature. As pointed out above, we have found it to be desirable to have the density of the cold gas less than that of the hot flash gas, which means, of course, that the molecular weight of the cold gas must be very much less than that of the flash gas. In practice, if cold methane is used as the sealing gas in the separation of an isoolefin-diolefin copolymer from the cold reaction mixture, the actual gas density will be about the same as that of the flash gas. We have found that the use of hydrogen is attractive from the standpoint of minimizing the volume of the gases removed from the flash tank and thereby minimizing the size of the refrigeration and fractionation equipment necessary to recover it from the methyl chloride or other light components of the recycled flashed gases. On the other hand, in large scale operation it may be difficult to keep traces of air from entering the system and in order to prevent a dangerous buildup of oxygen in the flushing gas, it is often necessary to bleed a considerable amount of hydrogen from the system. If natural gas (principally methane) is used instead of hydrogen, much more is required but there is not nearly so much danger of getting explosive mixtures and the natural gas is much cheaper to purge.

One disadvantage of natural gas is that methane is fairly soluble in the cold reaction liquid at −130° F. The amount of methane dissolving in the liquid can be minimized by providing baffles 27 and 28 in the enclosure near the end of the vibrating screen and adding the natural gas or other relatively soluble sealing gas at 29. If desired a slightly soluble gas such as nitrogen can also be introduced at 30. A small flow of nitrogen would be used relative to the methane. This nitrogen would flow past the baffles thereby preventing methane from entering the compartment in which the slurry is fed to the screen and would consequently prevent the methane from dissolving to any appreciable extent in the stream of circulating reactants. The nitrogen would mix with the methane at the end of the vibrating screen and by sufficient purging of the recycled methane, the molecular weight of the sealing gas could be kept down to about 18 or 20.

The polymer particles carrying some occluded or adsorbed reaction liquid discharged from the vibrating hopper fall freely as separated particles through the surge chamber and into a flashing liquid, preferably water, which is maintained at about 130–160° F. Vigorous agitation of the flashing liquid is provided by mixer 31 in order to prevent agglomeration of the polymer and to form a uniform water slurry. In view of the low boiling point of the liquids associated with the polymer, the bulk of these liquids flashes off immediately upon contact of the polymer with the water.

The sealing gases and the gases flashed off from the liquid entrained with the polymer are removed through outlet 32 and passed to a suitable recovery and repurification system.

The recovery system comprises essentially means for compressing the vapors, means for cooling the vapors to knock out condensible materials, means for drying the residual vapors and means for fractionating and condensing the vapors, leaving uncondensed the flushing gas which is cooled and recycled to the screen enclosure. The recovered reactants and/or catalyst solvent are recycled to the reactor, preferably after combining the recycle with sufficient fresh feed to make up for the reactants removed as finished polymer and for losses in the system. It is ordinarily convenient to combine the recycle and fresh feed with the circulating cold reaction liquid which may be done quite effectively in the sump tank 17.

The polymer is removed from the flash tank through outlet 33 in finely divided form as a slurry in hot water. The polymer may be separated from the slurry in any desired manner, a convenient method comprising simply discharging the slurry onto an endless belt type screen 34 such as a Louisville filtering machine wherein the polymer is passed between pairs of squeeze rolls 35, 36 and 37 and/or over suction boxes (not shown) in order to remove a maximum amount of water mechanically. In view of the fact that the polymer particles are somewhat compacted by the action of the squeeze rolls it is ordinarily advisable to pass the polymer through feed rolls 38 against a rapidly rotating picker roll 39 which disintegrates the agglomerates of polymer particles. The picker roll 39 deposits the polymer particles on an oscillating conveyor feeder 40 which supplies the polymer particles to the perforated moving belt or screen 41. The belt 41 carries the polymer through tunnel drier 42 or the like wherein the polymer is dried and any residues of volatile materials are removed by passing heated air through the bed of polymer on the conveyor belt 41. After drying, the polymer is ready for use and may be used directly or packaged for storage or shipment, in which event it is preferable to compact the polymer particles in order to reduce their bulk.

Figure 2 shows an alternative embodiment wherein the vibrating screen is arranged alongside the flash chamber. In this embodiment 101 is a vibrating screen or the like. Only the end of the screen is shown but it will be understood that the other elements such as the weir for distributing the cold slurry across the screen, as well as collecting troughs and cold filtrate outlets such as are shown in Figure 1 are provided. The screen is, of course, mounted in a casing 102 which is preferably provided with a jacket in which a refrigerant such as liquid ethylene may be introduced through line 103 in order to maintain the polymer at a sufficiently low temperature during and after the screening operation. Vaporized refrigerant or ethylene gas is withdrawn from the jacket at 104 and is compressed and cooled in order that it may be recirculated.

The screened polymer drops off the end of the screen shown onto a feeder 105 which has an electric vibrator or the like attached thereto to facilitate the movement of polymer particles thereover. The feeder 105 extends through connector pipe 107 which is also jacketed for the circulation of a refrigerant and is attached to the flash chamber 108.

The flash chamber 108 is somewhat different from that shown in Figure 1 and is provided with a turbine type mixer 109, a water inlet pipe 110 and a steam header 111 connected to a suitable steam supply. A liquid level is maintained in the lower part of the flash chamber, the polymer slurry overflowing weir 112 after passing under submerged weir 113 which is provided as a seal to keep the inflammable flashed gases in the flash chamber.

A surge chamber 114 is provided in the flash tank 108 and is of sufficient size to cover the end of the vibrating feeder 105 that extends into the flash tank and is of such volume that it is capable of absorbing pressure surges in the flash tank which occur due to uneven vaporization of volatile materials falling into the heated flashing liquid. In order to prevent flashed gases, and particularly water vapor from backing up into and icing the cold surfaces of the feeder, the connector pipe and the like, a sealing gas is introduced into the screen enclosure through line 115 and flows concurrently with the polymer particles through the connector pipe into the surge chamber and thence into the flash chamber proper. In order to maintain the interface between the flashed gases and the sealing gas near the bottom of the surge chamber, further sealing gas may be introduced into the surge chamber through line 116. This sealing gas may advantageously be recycle gas of essentially the same composition as the flashed gas and obtained from the purification and recovery system after knocking out the water vapor and cooling the resultant gas mixture.

Figure 3 illustrates another embodiment involving the use of a screw conveyor between the screening enclosure and the flash chamber. In this arrangement the vibrating screen 201, shown again in an end view, of the mechanically driven type, discharges into the feed end of a nickel-steel helical conveyor screw 202. The screw discharges into the flash tank 205, similar to the one shown in Figure 1. Surge chamber 206, similar to that shown in Figure 2, covers the discharge end of the screw, which projects slightly into the flash tank. The screw is driven by motor 207 through a reduction gear, and is housed in ethylene-jacketed tube 204. The screen housing, 203 is likewise jacketed with low temperature refrigerant. The flushing gas is introduced to the screen housing at a suitable point such as at 208.

Figure 4 illustrates an embodiment utilizing a "star" feeder. The vibrating screen and flash tank are similar to those shown in Figure 1. The polymer falling off the end of vibrating screen 301 drops into a pipe or flue with a funnel-shaped upper opening, and in the central portion of which is a rotating paddle or "star" feeder 303. The axis of the paddle is set to one side of the tube, there being a bulge or pocket to permit the paddles to ascend without interfering with the downward passage of polymer. The tube discharges as before into the surge chamber 304 which is kept clear of ice by virtue of the flushing gas flowing concurrently with the polymer, introduced at 305. A rotary feeder of this type presents a rather positive means of polymer transfer. Wipers or brushes may be provided, if necessary, to keep the paddle blades free of adhering rubber. The whole transfer tube 303 as well as the screen enclosure are jacketed with a suitable low temperature refrigerant to prevent sticking of the polymer to the walls.

Figures 5 and 6 show in more detail an advantageous arrangement of equipment using a vibrating hopper. Here, 401 is the hopper, which may suitably be constructed of stainless steel, "K" Monel, nickel, etc., as mentioned before in reference to the vibrating screen. The hopper is of a wide oval shape at the top such that it subtends the full width of the vibrating screen 402, and tapers down to a cylindrical tube or pipe. The hopper is supported by brackets 403, resting on lugs 404, welded to the wall of the housing, 408. The brackets can be raised from these supporting lugs by means of screws 405 bolted thereto, which pass through the housing through stuffing boxes 406 and to which are attached handwheels 407. The vibratory motion is imparted to the hopper by electromagnetic vibrator 409 enclosed in vapor proof casing 410. This motion is a high frequency, low amplitude straight line motion perpendicular to the axis of the hopper. When it is desired to clear the screen or hopper of an obstruction, the feed of slurry and the vibration is stopped, the hopper raised by turning handwheels 407 and the gate valve 411 between the screen enclosure and the flash tank 412 is closed. The screen enclosure is then purged of inflammable and noxious gases, and one of the hand or manholes such as at 415 is opened. The use of the gate valve permits relatively quick opening of the screen enclosure without necessitating purging of the flash tank, which is large compared to the screen enclosure and would require a long time to purge. Sight glasses 416 and 417 permit observance of the screen discharge for plugs and icing. 413 is the ethylene jacket around the screen housing and 414 a similar jacket around the body of the gate valve. By keeping the valve cold, warm-up and sticking of rubber in the downspout section of the hopper is avoided. A ring of insulation at 418 allows the maintenance of the contiguous flash tank wall at a temperature above the freezing point of water. Flushing gas is passed into the enclosure 408 and discharges through the passageway in the gate valve around the downspout as well as through the hopper and downspout with the polymer into the flash tank. The surge chamber 419 with fins 420 is provided in the flash tank as in Figure 1.

Figure 7 shows an alternate form of vibrating screen applicable to the use of flushing gas and the surge chamber. 501 is the vibrating screen enclosed in drum 502 surrounded by a liquid ethylene jacket 503. Cold reaction slurry is admitted at 504 and distributed over the feed end of the screen by chute 505. The solid polymer particles retained on the screen are discharged through downspout 506 which is rigidly attached to the screen frame and receives its vibrating motion therefrom. The rubber drops through a surge chamber into the flashing zone as in Figure 1. The vibratory motion is imparted to the screen by means of an explosion-proof electromagnetic vibrator 508, supported on beam 510 by spring suspensions 509. The screen is supported by spring suspensions 516 at its feed end and by a yoke attached to the vibrator at its middle. The vibrator is mounted in a dome shaped section of the screen housing separated from the rest of the enclosure by insulating baffle 511, which permits maintenance of the vibrator mechanism and spring supports at a temperature considerably above that prevailing in the screening zone. In this way it is possible to use a vibrator of more or less standard design.

In order to facilitate adjustments to screen operation and ready removal of any interfering plugs or other obstructions provision is made for ready removal of the head of the drum enclosing the screen as at 507. In this connection the use of a valve between the screening zone and the flashing zone is advantageous. The cold liquid passing through the screen runs down its trough-shaped bottom 513 into collecting funnel 514 in the housing from which the liquid is returned to the reaction zone. Flushing gas is admitted at 515 as in the previous illustrations.

The following examples are given as illustrative of the manner of carrying out the present invention. It will be understood, however, that our invention is not limited thereto.

*Example I*

A slurry containing approximately 3 wt. per cent of an isoprene-isobutylene copolymer in a mixture of liquid reactants and methyl chloride diluent is prepared by injection of a catalyst consisting of a 0.2 wt. per cent solution of aluminum chloride in methyl chloride into an agitated reactor to which a mixture of recycle liquid and fresh feed is continuously added and from which slurry is continuously withdrawn. Dry carbon black is added to the recycle stream in sufficient quantity to give approximately 10 wt. per cent on the copolymer produced. The slurry so produced is fed to a 12" x 36" vibrating screen enclosed in a 4'-4" x 3'-2" x 2'-0" pressure tight stainless steel housing. The slurry is distributed by means of a weir box on the screening surface, small (2–10 mesh) particles of polymer being discharged through a 2" diameter vibrating downspout extending through a 4" diameter transition piece into the upper end of a surge chamber. The filtrate from the vibrating screen is accumulated and recycled to the reactor. The surge chamber, a 10" upper diameter x 20" lower diameter externally finned, 4' long truncated cone extends into a 3' diameter by 10'-3" flash tank, supplied with steam and water to maintain the temperature therein at about 120–130° F. The screen housing is maintained at about −100° F. by a jacket of crushed dry ice. 100 standard cubic feet per hour of hydrogen is passed through the housing into the flash tank, while dropping about 15 lbs. per hour of polymer entraining about 40 lbs. per hour of adhering liquid through the downspout into the flash tank. No frosting is observed in the screen enclosure. When operating similarly using a flow of 166 standard cubic feet per hour of nitrogen as a flushing gas, some frosting is observed to occur near the discharge end of the screen.

Example II

An approximately 6 wt. per cent slurry of an isobutylene-butadiene copolymer in excess cold liquid reactants is fed to a 3' wide x 10' long vibrating screen enclosed in a liquid ethylene jacketed 5' diameter x 14' long pressure tight cylindrical housing. The copolymer, entraining about 1½ to 4 times its weight of liquid passing over the screen, is discharged into a separately actuated vibrating hopper (6¾" diameter at its narrowest) and dropped therethrough into a 10 ft. diameter by 40 ft. high vertical flash tank containing about 5 ft. of heated agitated water in its lower end. The inlet for the copolymer consists of a 24" nozzle, to which is attached a 24" upper diameter x 54" lower diameter x 8 ft. long surge chamber in the shape of a truncated cone projecting downwardly into the interior of the flash tank. The screen housing and reactants are maintained at about $-140°$ F.; the interior of the flash tank is kept at $120$–$150°$ F. by controlled injection of steam into the water.

With a flow of 3600 standard cubic feet per hour of dry methane and a rate of copolymer discharge of 2000 lbs. per hour, no frosting is observed in the screen housing.

Our invention is applicable to the separation of any solid, high molecular, low temperature polymerizates from isoolefinic materials alone or from mixtures of isoolefinic materials with a number of other diolefinic materials capable of copolymerizing with isoolefins. The isoolefin that is preferred is isobutylene but other isoolefins containing up to about 8 carbon atoms per molecule may be used. The copolymerizable diolefinic materials include butadienes and substituted butadienes, especially isoprene, piperylene and dimethyl butadiene. Other polyolefinic materials containing up to 12 or 14 carbon atoms per molecule such as mycrene and certain non-conjugated diolefins, such as dimethylallene and the like, are also useful.

The olefinic materials are preferably cooled to temperatures below about $-40°$ C. and polymerized by the addition of a catalyst consisting of a Friedel-Crafts type catalyst dissolved in a low-freezing non-complex-forming solvent such as methyl-, ethyl- or propyl, mono- or polyhalides or carbon disulfide or sulfuryl chloride or the like. The reactants, catalysts, solvents and the like and the general properties of the polymers formed are described in the above-mentioned Mueller-Cunradi et al. U. S. Patent 2,203,873 and the Australian Patent 112,875.

The foregoing description and examples are intended to be illustrative and it will be understood that numerous variations are possible without departing from the purview of this invention as defined in the following claims.

What we claim and desire to secure by Letters Patent is:

1. In the process of preparing high molecular weight polymers by polymerizing an isoolefin in a diluent at a temperature below about $-40°$ C. in contact with a Friedel-Crafts type catalyst to form a slurry of solid polymer particles in cold reaction liquid, separating the solid polymer particles from the cold reaction liquid at substantially the reaction temperature and returning the latter to the reaction, the improvement which comprises transferring the separated polymer particles to a flashing zone concurrently with a stream of sealing gas sufficient to prevent backing up of flashed gases into cold equipment.

2. In the process of preparing high molecular weight polymers by polymerizing an isoolefin in a diluent at a temperature below about $-40°$ C. in contact with a Friedel-Crafts type catalyst to form a slurry of solid polymer particles in cold reaction liquid, separating the solid polymer particles from the cold reaction liquid at substantially the reaction temperature and returning the latter to the reaction, the improvement which comprises transferring the separated polymer particles to a zone containing well agitated heated water for flashing off residual reaction liquid adhering to the polymer concurrently with a stream of sealing gas sufficient to prevent water vapor and flashed gases from backing up into cold equipment wherein they would cause icing.

3. In the process of preparing high molecular weight polymers by polymerizing a mixture of a major portion of an isoolefin and a minor portion of a conjugated diolefin in a diluent at a temperature below about $-40°$ C. in contact with a solution of a Friedel-Crafts type catalyst in a solvent which forms no complex with the Friedel-Crafts catalyst and is liquid at the reaction temperature to form a slurry of solid polymer particles in cold reaction liquid, continuously separating the solid polymer particles from the cold reaction liquid at substantially the reaction temperature and returning the latter to the reaction, the improvement which comprises transferring the separated polymer particles to a flashing zone concurrently with a stream of sealing gas sufficient to prevent backing up of flashed gases into cold equipment.

4. In the process of preparing high molecular weight polymers by polymerizing a mixture of a major portion of an isoolefin and a minor portion of a conjugated diolefin in a diluent at a temperature below about $-40°$ C. in contact with a solution of a Friedel-Crafts type catalyst in a solvent which forms no complex with the Friedel-Crafts catalyst and is liquid at the reaction temperature to form a slurry of solid polymer particles in cold reaction liquid, continuously separating the solid polymer particles from the cold reaction liquid at substantially the reaction temperature and returning the latter to the reaction, the improvement which comprises transferring the separated polymer particles to a zone containing well agitated heated water for flashing off residual reaction liquid adhering to the polymer concurrently with a stream of sealing gas sufficient to prevent water vapor and flashed gases from backing up into cold equipment wherein they would cause icing.

5. In the process of preparing high molecular weight polymers by polymerizing a mixture of a major portion of an isoolefin and a minor portion of a conjugated diolefin in a diluent at temperatures below about $-40°$ C. in contact with a solution of a Friedel-Crafts type catalyst in a solvent which forms no complex with the Friedel-Crafts catalyst and is liquid at the reaction temperature to form a slurry of solid polymer particles in cold reaction liquid, continuously separating the solid polymer particles from the cold reaction liquid at substantially the reaction temperature and recycling the cold reaction liquid to the reaction the improvement which comprises, introducing nitrogen into a closed chamber wherein the separation is effected at a pressure sufficient to prevent extraneous gases from entering said closed chamber, transferring the separated polymer particles to a zone containing well agitated heated water for flashing off residual reaction liquid adhering to the polymer, introducing a stream of sealing gas to flow concurrently with the polymer particles into the flashing zone, the volume of the sealing gas stream being sufficient to prevent water vapor and flashed gases from backing up into cold equipment wherein they would cause icing.

6. The process as defined in claim 5 wherein the sealing gas is methane.

7. The process as defined in claim 5 wherein the sealing gas is hydrogen.

8. The process as defined in claim 5 wherein the sealing gas is natural gas.

9. In the process of preparing high molecular weight polymers by polymerizing a mixture of a major portion of an isoolefin and a minor portion of a conjugated diolefin in a diluent at a temperature below about −40° C. in contact with a solution of a Friedel-Crafts type catalyst in a solvent which forms no complex with the Friedel-Crafts catalyst and is liquid at the reaction temperature to form a slurry of solid polymer particles in cold reaction liquid, continuously separating the solid polymer particles from the cold reaction liquid at substantially the reaction temperature and returning the latter to the reaction, the improvement which comprises transferring the separated polymer particles to a zone containing well agitated heated water for flashing off residual reaction liquid adhering to the polymer concurrently with a stream of hydrogen sufficient to prevent water vapor and flashed gases from backing up into cold equipment wherein they would cause icing.

10. In the process of preparing high molecular weight polymers by polymerizing a mixture of a major portion of an isoolefin and a minor portion of a conjugated diolefin in a diluent at a temperature below −40° C. in contact with a solution of a Friedel-Crafts type catalyst in a solvent which forms no complex with the Friedel-Crafts catalyst and is liquid at the reaction temperature to form a slurry of solid polymer particles in cold reaction liquid, continuously separating the solid polymer particles from the cold reaction liquid at substantially the reaction temperature and returning the latter to the reaction, the improvement which comprises transferring the separated polymer particles to a zone containing well agitated heated water for flashing off residual reaction liquid adhering to the polymer concurrently with a stream of methane sufficient to prevent water vapor and flashed gases from backing up into cold equipment wherein they would cause icing.

11. In the process of preparing high molecular weight polymers by polymerizing a mixture of a major portion of an isoolefin and a minor portion of a conjugated diolefin in a diluent at a temperature below about −40° C. in contact with a solution of a Friedel-Crafts type catalyst in a solvent which forms no complex with the Friedel-Crafts catalyst and is liquid at the reaction temperature to a form a slurry of solid polymer particles in cold reaction liquid, continuously separating the solid polymer particles from the cold reaction liquid at substantially the reaction temperature and returning the latter to the reaction, the improvement which comprises transferring the separated polymer particles to a zone containing well agitated heated water for flashing off residual reaction liquid adhering to the polymer concurrently with a stream of nitrogen sufficient to prevent water vapor and flashed gases from backing up into cold equipment wherein they would cause icing.

12. In combination, means for continuously separating solid polymer particles from a slurry thereof in reaction liquid at a temperature below about −40° C., an enclosure for said separating means, a flash chamber containing heated well agitated flashing liquid and having an inlet for the introduction of cold polymer particles, means for transferring the polymer particles from said separating means to the polymer inlet of said flash chamber and a surge chamber inside said flash chamber surrounding said polymer inlet for preventing flashed gases from reaching said inlet, and means for introducing a sealing gas into said enclosure.

13. In combination, means for continuously separating solid polymer particles from a slurry thereof in reaction liquid at a temperature below about −40° C., an enclosure for said separating means, a flash chamber having an inlet for the introduction of cold polymer particles and containing heated, well agitated water, means for transferring the polymer particles from said separating means to the polymer inlet of said flash chamber, a surge chamber inside said flash chamber surrounding said polymer inlet and means for introducing sealing gas into said surge chamber.

14. In combination, means for continuously separating solid polymer particles from a slurry thereof in reaction liquid at a temperature below about −40° C., an enclosure for said separating means, a flash chamber having an inlet for the introduction of cold polymer particles thereinto and containing heated, well agitated water, a surge chamber inside said flash chamber surrounding said polymer inlet, means for transferring the polymer particles from said separating means to the polymer inlet of said flash chamber, means for introducing a sealing gas into the enclosure for said separating means to flow with the polymer particles from said separating means into the flash chamber, in sufficient amount to prevent icing of said separating means.

15. In combination, a vibrating screen for continuously separating solid polymer particles from a slurry thereof in reaction liquid at a temperature below about −40° C., an enclosure for said vibrating screen, a flash chamber having an inlet for the introduction of cold polymer particles thereinto and containing heated, well agitated water, a surge chamber inside said flash chamber surrounding said polymer inlet, means for transferring the polymer particles from said vibrating screen to the polymer inlet of said flash chamber, means for introducing a sealing gas into the enclosure for said vibrating screen to flow with the polymer particles from said vibrating screen into the flash chamber, in sufficient amount to prevent icing of said vibrating screen.

16. In combination, means for continuously separating solid polymer particles from a slurry thereof in reaction liquid at a temperature below about −40° C., an enclosure for said separating means, a flash chamber having an inlet for the introduction of cold polymer particles thereinto and containing heated, well agitated water, a surge chamber inside said flash chamber surrounding said polymer inlet, a vibrating feeder for transferring the polymer particles from said separating means to the polymer inlet of said flash chamber, means for introducing a sealing gas into the enclosure for said separating means to flow with the polymer particles from said separating means into the flash chamber in sufficient amount to prevent icing of said separating means.

17. In combination, a vibrating screen for continuously separating solid polymer particles from a slurry thereof in reaction liquid at a temperature below about −40° C., an enclosure for said vibrating screen, a flash chamber having an inlet for the introduction of cold polymer particles thereinto and containing heated, well agitated water, a surge chamber inside said flash chamber surrounding said polymer inlet, a vibrating hopper for transferring the polymer particles from said vibrating screen to the polymer inlet of said flash chamber, means for introducing a sealing gas into the enclosure for said vibrating screen to flow with the polymer particles from said vibrating screen into the flash chamber, in sufficient amount to prevent icing of said vibrating screen.

18. In combination, means for continuously separating solid polymer particles from a slurry thereof in reaction liquid at a temperature below about −40° C., an enclosure for said separating means, a flash chamber having an inlet for the introduction of cold polymer particles thereinto and containing heated, well agitated water, a surge chamber inside said flash chamber surrounding said polymer inlet, a screw conveyor for transferring the polymer particles from said separating means to the polymer inlet of said flash chamber, means for introducing a sealing gas into the enclosure for said separating means to flow with the polymer particles from said separating means into the flash chamber, in sufficient amount to prevent icing of said separating means.

19. In combination, means for continuously separating solid polymer particles from a slurry thereof in reaction liquid at a temperature below about −40° C., an enclosure for said separating means, a flash chamber having an inlet for the introduction of cold polymer particles thereinto and containing heated, well agitated water, a surge chamber inside said flash chamber surrounding said polymer inlet, a star feeder for transferring the polymer particles from said separating means to the polymer inlet of said flash chamber, means for introducing a sealing gas into the enclosure for said separating means to flow with the polymer particles from said separating means into the flash chamber, in sufficient amount to prevent icing of said separating means.

20. In combination, a vibrating screen for continuously separating solid polymer particles from a slurry thereof in reaction liquid at a temperature below about −40° C., an enclosure for said vibrating screen, a flash chamber having an inlet for the introduction of cold polymer particles thereinto and containing heated, well agitated water, a surge chamber inside said flash chamber surrounding said polymer inlet, a vibrating hopper attached to and actuated by said vibrating screen for transferring the polymer particles from said vibrating screen to the polymer inlet of said flash chamber, means for introducing a sealing gas into the enclosure for said vibrating screen to flow with the polymer particles from said vibrating screen into the flash chamber, in sufficient amount to prevent icing of said vibrating screen.

21. In combination, a vibrating screen for continuously separating solid polymer particles from a slurry thereof in reaction liquid at a temperature of below about −40° C., a flash chamber having an inlet for the introduction of cold polymer particles thereinto and containing heated, well agitated water for degassing the polymer particles, a surge chamber inside said flash chamber surrounding said polymer inlet, a vibrating hopper for transferring the polymer particles from said vibrating screen to the polymer inlet of said flash chamber, an enclosure for said vibrating screen and vibrating hopper, means for raising and lowering the vibrating hopper, a valve at the inlet of the flash chamber for sealing off the flash chamber from said enclosure and means for introducing a sealing gas into said enclosure to flow with the polymer particles from said vibrating screen and hopper into the flash chamber in sufficient amount to prevent icing of said screen and hopper.

22. In combination, means for continuously separating solid polymer particles from a slurry thereof in reaction liquid at a temperature below about −40° C., an enclosure for said separating means, a baffle in said enclosure dividing the said enclosure into a polymer slurry inlet zone and a polymer outlet zone, a flash chamber having an inlet for the introduction of cold polymer particles thereinto and containing heated well agitated water, a surge chamber inside said flash chamber surrounding said polymer inlet, means for transferring the polymer particles from the outlet zone of said separating means to the polymer inlet of said flash chamber, means for introducing a sealing gas which is at most slightly soluble in the reaction liquid into said inlet zone of said enclosure and means for introducing another sealing gas into the outlet zone of said enclosure so as to flow with the polymer particles from said separating means into said flash chamber in sufficient amount to prevent icing of the said separating means.

EGER V. MURPHREE.
WENDELL W. WATERMAN.
ARTHUR D. GREEN.